United States Patent [19]

Billmers et al.

[11] Patent Number: 4,992,536

[45] Date of Patent: Feb. 12, 1991

[54] PREPARATION OF POLYCATIONIC POLYSACCHARIDES BY SITE SELECTIVE REACTION

[75] Inventors: Robert L. Billmers, Stockton; Daniel B. Solarek, Bridgewater; Ralph M. Trksak, Manville, all of N.J.

[73] Assignee: National Starch and Chemical Investment Holding Corporation, Wilmington, Del.

[21] Appl. No.: 429,444

[22] Filed: Oct. 31, 1989

[51] Int. Cl.$^5$ .............................................. C08B 37/00
[52] U.S. Cl. .................................. 536/55.1; 536/18.7; 536/120
[58] Field of Search ................. 536/120, 18.7, 55.1, 536/124, 43, 45, 46, 50

[56] References Cited

U.S. PATENT DOCUMENTS

| | | | |
|---|---|---|---|
| 3,930,877 | 1/1976 | Aitken | 106/287.22 |
| 4,129,722 | 12/1978 | Iovine et al. | 536/43 |
| 4,281,109 | 7/1981 | Jarowenko et al. | 536/50 |
| 4,452,978 | 6/1984 | Eastman | 536/111 |
| 4,785,087 | 11/1988 | Stober et al. | 536/111 |

*Primary Examiner*—Ronald W. Griffin
*Assistant Examiner*—Nancy S. Carson
*Attorney, Agent, or Firm*—Mary E. Porter; Edwin M. Szala

[57] ABSTRACT

Polycationic polysaccharide derivatives containing more than one cationic substituent per substituted hydroxyl group are prepared by a site selective reaction of a cationic polysaccharide derivative with a suitable cationic reagent at a pH from 7.0 to 9.0. Suitable reagents include cationic alkyl, aryl, alkaryl, cycloaliphatic, or heterocyclic amines, and polymer thereof, which selectively react with a cationic substituent rather than a hydroxyl group of the cationic polysaccharide derivative. The polycationic polysaccharide derivatives prepared from these reagents are useful in the manufacture of paper.

8 Claims, No Drawings

PREPARATION OF POLYCATIONIC POLYSACCHARIDES BY SITE SELECTIVE REACTION

BACKGROUND OF THE INVENTION

This invention relates to cationic polysaccharides which contain more than one cationic substituent per substituted hydroxyl group so as to provide a higher cationic charge density than that of known cationic polysaccharides This is achieved by a site selective reaction process, wherein a cationic polysaccharide derivative is first prepared employing a suitable cationic reagent, and then the pH is adjusted such that additional cationic reagent preferentially reacts with the cationic substituents rather than the remaining hydroxyl groups of the polysaccharide.

The modification of starch and other polysaccharides by chemical derivatization to produce various cationic polysaccharides is well known. Cationic polysaccharides, i.e., polysaccharides which have been modified so that they have a positive electrostatic charge, are used for a large number of applications and are particularly useful in the manufacture of paper due to their superior performance in the paper production as compared to unmodified polysaccharides. Amphoteric polysaccharides i.e., polysaccharides which have been modified so they have cationic groups, together with a controlled amount of anionic (e.g., phosphate) groups, are used in a similar manner, with superior performance as compared to unmodified polysaccharides.

As used herein, the term "paper" includes sheet-like masses and molded products made from fibrous cellulosic material, which may be derived from natural sources as well as from synthetics such as polyamides, polyesters and polyacrylic resins, as well as from mineral fibers such as asbestos and glass. Also included are papers made from combinations of cellulosic and synthetic materials.

Various materials, including starch, are added to the pulp or stock, during the paper-making process, prior to the formation of the sheet. One purpose of such additives is to bind the individual fibers to one another, thus aiding the formation of a stronger paper. Alum is employed in traditional paper-making processes which are conducted under acidic conditions. Alum-free, alkaline conditions in paper-making processes are now becoming common in the industry.

In the case of those papers which contain added pigments, such as titanium dioxide, it has been known to add materials to the pulp, or stock, for the specific purpose of retaining a greater proportion of such pigments in the paper (rather than have them drain off in the water that is removed during the formation of the sheet). Such additives are often referred to as "pigment retention agents." Cationic starches have long been employed as additives in paper production for their contributions to drainage, strength and pigment and fine pulp retention in paper.

It has now been discovered that unexpected superior performance in paper production may be achieved by the use of novel cationic polysaccharide derivatives which are prepared by reaction of a polysaccharide with a cationic reagent employing a two-stage, site selective reaction to produce a di- or multi-cationic, high charge density polysaccharide derivative. The performance of these derivatives far exceeds their expected performance based on molar substitution alone. Their performance is most advantageous in alum-free processes for making paper under alkaline conditions. It is believed that the high charge density per saccharide monomer unit is responsible for the unexpected improvement in performance.

Accordingly, this invention provides a new class of cationic polysaccharide derivatives prepared by a site selective reaction. These cationic polysaccharides are useful in paper manufacturing and show improved drainage, pigment and pulp retention and paper strength as compared to cationic polysaccharides of the prior art.

SUMMARY OF THE INVENTION

The polycationic polysaccharides of the present invention are polysaccharide derivatives which contain two or more cationic groups per substituted hydroxyl group. The derivatives are prepared by a two stage reaction. In the first stage a suitable polysaccharide is reacted with a suitable cationic reagent to form an ether derivative. The cationic reagent typically contains a single polysaccharide reactive group and an alkyl, aryl, alkaryl, cycloaliphatic or heterocyclic amine, preferably a tertiary amine In the second stage the pH is adjusted and a site selective reaction occurs between a cationic reagent and the cationic substituent on the polysaccharide derivative. The reaction introduces multiple cationic substituent groups which provide a high charge density cationic polysaccharide at relatively low levels of substitution in comparison to the charge distribution of known cationic polysaccharides. Thus, where cationic polysaccharides of the prior art have substituents with a single cationic group, the cationic polysaccharides of the present invention have substituents with two or more cationic groups located on the substituted hydroxyl group.

Cationic polysaccharides prepared by this process are more effective in paper manufacturing than polysaccharides of the prior art where the two polysaccharides have the same cationic group content (e.g., equal nitrogen content), particularly under alum-free, alkaline conditions. It follows that these polysaccharides are effective at a lower molar substitution than the polysaccharides of the prior art in paper manufacturing.

The polysaccharide derivatives herein are also useful in other applications wherein cationic polysaccharides have been previously employed.

DESCRIPTION OF THE PREFERRED EMBODIMENTS

As used herein, the term "polysaccharides" refers to starches and starch-containing substances, dextrins and oligosaccharides and gums and celluloses which will react with suitable reagents under the conditions disclosed herein. In a preferred embodiment, the polysaccharide is starch The starches which may be used in preparing the cationic polysaccharide derivatives of the present invention may be derived from any plant source including corn, potato, sweet potato, wheat, rice, waxy rice, sago, tapioca, waxy maize, sorghum, high amylose corn, etc. Also included are derivatized starches such as starch ethers and esters (provided the ester is prepared after the site selective reaction herein); crosslinked starches, the conversionproducts derived from starches including, for example, dextrins prepared by the hydrolytic action of acid and/or heat; oxidized starches prepared by treatment with oxidants such as sodium hypochlorite; and fluidity or thin boiling starches prepared by enzyme conversion or by mild acid hydrolysis. In particular, amphoteric starches may be prepared by reacting the polycationic reagents disclosed herein with reagents carrying an anionic charge (e.g., phosphate containing starch). These polycationic amphoteric starch derivatives are particularly useful in paper manufacturing.

The use of the term "starch" herein includes any amylaceous substance. whether untreated or chemically modified, which retains free hydroxyl groups capable of entering into the reaction of this invention. If the desired product is to be a granular starch, the initial starting material must be in granular form. It is to be noted that the method of the invention may also be carried out employing gelatinized starches which will result in the production of non-granular starch derivatives.

The practitioner will recognize that the starch molecule is a polymer which contains many anhydroglucose units, each having three free hydroxyl groups (except the non-reducing end glucose units which contain four free hydroxyl groups and the 1.6-branched glucose units which contain two free hydroxyl groups) which may react with the reagent. Thus, the number of such displacements or the degree of substitution (D.S.) may vary with the particular starch, the ratio of the reagent to the starch and, to some extent, the reaction conditions. Similar variability may be observed in the molar substitution ratio (the moles of cationic substituent per mole of anhydroglucose). Furthermore, because the relative reactivity of each of the hydroxyl groups within the anhydroglucose unit is not equivalent, it is probable that some will be more reactive with the reagent than others.

Preparation of the starch derivatives of this invention comprises two steps. The first step comprises reacting a cationic reagent, as described below, with starch which is suspended or dispersed in water. The reaction of the reagent with the starch is preferably carried out at temperatures ranging from about 10° to 90° C. The lower temperatures (10–50° C.) are preferred for granular starch reactions.

The pH of the reaction mixture is ordinarily controlled so as to be above 9.0 but below 12.5, with the preferred range being dependent upon the reagent employed in the reaction. The preferred pH range is typically from 11.0 to 12.0. The pH is conveniently controlled by a periodic addition of a dilute aqueous solution of sodium hydroxide or other common base, including potassium hydroxide, sodium carbonate, calcium hydroxide, etc. Alternately, the pH is not controlled but an excess of the base is added initially to maintain alkaline pH throughout the reaction. Under certain conditions, it may also be desirable to add salts such as sodium sulfate or sodium chloride to suppress swelling of the starch and to provide a more easily filtered starch product. When hydrophobic reagents are employed, a phase transfer catalyst, such as tetramethylammonium hydroxide, also may be employed The amount of reagent used to react with the starch will vary from about 1 to 100%, preferably from 3 to 20%, based on the dry weight of the starch and dependent on such factors as the starch employed, the degree of substitution required in the end product and the particular reagent used.

Reaction time will typically vary from about 0.2 to 20 hours, preferably 1 to 16 hours depending on such factors as the reactivity of the reagent, the amount of reagent, the temperature and pH employed.

The second step comprises lowering the pH to about 7.0 to 9.0, preferably 7.5 to 8.5, and permitting the reaction to continue with the same reagent or adding a new reagent and, optionally, removing the old reagent. Reaction time for the second step may vary from 12 to 96 hours, preferably 18 to 48 hours. Typically, a reaction at 45° C. requires 48 hours, while a reaction at 60° C. requires 18–24 hours. The second step of the reaction will not proceed at temperatures around 100° C. or higher and the preferred temperature range is 40° to 60° C.

After completion of the reaction, the pH of the reaction mixture is preferably adjusted to 3.0 to 7.0 with any common acid such as hydrochloric sulfuric, or acetic. The resultant modified starch, if in granular form, is then recovered by filtration, washed free of residual salts with water, and dried. Alternatively, the washed product may be drum dried, or spray dried, or jet-cooked and spray dried, or simultaneously cooked and dried by steam atomization processes, or gelatinized and isolated by alcohol precipitation or freeze-drying. If the starch product is non-granular, it can be purified by dialysis, to remove residual salts and isolated by alcohol precipitation, freeze-drying, or spray-drying.

In a preferred embodiment, any of several dry processes for preparation of cationic starches may be employed herein for the first step of the reaction, provided that the pH in the second step is maintained at about 7.5 to 8.5. These dry processes are typically carried out in the presence of less than 30% water (on a starch dry weight basis), at alkaline pH, employing a beta-haloamine or an etherifying halohydrin or epoxide polycationic reagent and granular starch in a substantially dry state. Dry reaction processes suitable for use herein include, but are not limited to, processes taught in U S. Pat. Nos. 4,785,087, issued Nov. 15, 1988 to Stober, et al.; 4,281,109 issued July 28, 1981 to Jarowenko, et al. and 4,452,978 issued June 5, 1984 to Eastman; and U.K. Pat. No. 2,063,282, issued Apr. 7, 1983 to Fleche, et al.

In another embodiment, reactions with the cationic reagents are conveniently carried out using the procedure of U.S. Pat. No. 4,129,722 (issued Dec. 12, 1978 to C. P. Iovine, et al.). The polysaccharide is suspended in an organic solvent and a water solution of the derivatizing reagent is added thereto. Derivatization in the resultant two-phase mixture is ordinarily carried out with agitation at temperatures of 30° to 85° C., adding alkali if necessary to effect reaction. At least one of the initial phases (i.e., the suspended polysaccharide or the aqueous reagent solution) contains a suitable surfactant. It is important that the organic solvent used in the initial polysaccharide phase be immiscible with the aqueous derivatizing reagent phase, that it not dissolve the polysaccharide derivative as it is formed, that it have a boiling point at or above the temperature of the derivatizing reaction, that it be insensitive to alkali and not participate in the derivatization reaction.

The two phase procedure may also be used to prepare derivatives containing substituents derived from different reagents without isolating the substitution product from each reagent. This multiple substitution may be accomplished by the addition of several different reagents to the substrate-surfactant alkali mixture at the same time or sequentially.

After completion of the reaction the solid cationic polysaccharides may be separated, if desired, from the reaction mixture by centrifugation or filtration. Preferably, the derivative is purified by washing with water in the case of the starch derivatives. The derivatives are then dried using conventional methods, as in a vacuum-, drum-, flash-, belt-, or spray-drier.

In a preferred embodiment the polycationic polysaccharide derivative is prepared by the site selective reaction of a polysaccharide with a diethylaminoethyl halide to yield a derivative having the general structure:

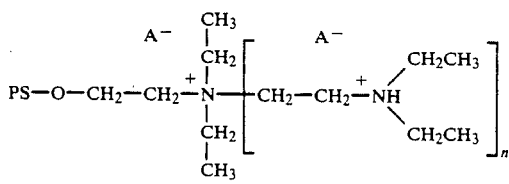

wherein PS is a polysaccharide; $A^-$ is an anion; and n is an integer from 1 to about 10. Typically, the anion is chloride, bromide or iodide.

Reagents useful in preparing the polysaccharide derivatives of this invention include any cationic reagent having at least one cationic group and one polysaccharide-reactive group. The practitioner will recognize that only ether forming reagents are useful in the first step of this reaction because esters are labile at the pH range required for the second step of the reaction. Furthermore, because one of the amines of the reagent employed in the first step must be reactive at the pH of the second step, the reagent used in the first step may be a primary, secondary or tertiary amine, but cannot be a quaternary amine which is not reactive under these conditions. Quaternary amines may be employed in the second step.

Suitable reagents which contain polysaccharide-reactive groups include but are not limited to, any of the well known etherifying reagents commonly used to produce nonionic, cationic or anionic sites on the polysaccharide. Such reagents include, but are not limited to, epoxide etherifying agents; halohydrins and other halogen substituted reagents; activated unsaturated compounds capable of reacting with the hydroxyl groups of the polysaccharide; beta- and gamma-halo amines; azetidines; benzyl halides; and alpha-halo aldehydes, ketones, alkenes, acids and amides; alone or in combination with each other.

The polysaccharide-reactive group is typically a beta-chloroalkylamine, an epoxide, or a chlorohydrin group, such as are well known in the art. Any polysaccharide etherifying reagent is suitable for use herein, provided that the polycationic reagent contains a single polysaccharide-reactive group so as to avoid crosslinking. Further, for paper manufacturing purposes, the polysaccharide must be water dispersible upon cooking and must not be excessively degraded as a result of reaction with the reagent. The practitioner will recognize that degradation which is excessive in one paper application may be appropriate in a different application and will select reagents and reaction conditions accordingly.

In addition to a polysaccharide-reactive group, the reagent must also contain at least one cationic group. Preferred cationic groups are tertiary and secondary amines, or other nitrogen-containing, positive electrostatically charged groups. Quaternary amine-containing reagents may be employed in the second step.

Preferred reagents are selected from the group consisting of cationic, polysaccharide-reactive, alkyl, aryl, alkaryl, cycloaliphatic or heterocyclic amines. These reagents must contain one or more cationic groups(s).

Suitable cationic polysaccharide-reactive, alkyl, aryl, alkaryl, cycloaliphatic or heterocyclic amine reagents include those containing polyamine moieties, such as tertiary bis(dialkylamino-) alkyls, tertiary tris(dialkylamino-) alkyls, quaternary bis(trialkylamino-) alkyls, dialkylamino-trialkylaminoalkyls, and aryl and alkaryl isomers thereof, and limited (e.g., about 2 to 10 amine moieties) polymeric forms thereof.

Suitable cationic, heterocyclic alkyl reagents include polysaccharide-reactive polyamine glycoside reagents such as glucosides containing at least one tertiary or quaternary, di- or tri-alkyl, aryl or alkaryl amino-substituted alkyls, aryls or alkaryls; glucosides containing tertiary bis(dialkyl, aryl or alkaryl amino-) substituted alkyls, aryls or alkaryls; or quaternary bis(tri- alkyl, aryl, or alkaryl amino-) substituted alkyls, aryls or alkaryls; or diamino-substituted alkyls, aryls or alkaryls containing a tertiary di- and a quaternary tri-, alkyl, aryl, or alkaryl aminoalkyl moiety; and polymeric (e.g., oligosaccharides of about 2 to 30 glucoside units) forms thereof. Also suitable for use herein are polysaccharide-reactive polyamine glycosides (i.e., mono- or oligo-saccharides other than glucose).

Suitable cationic polysaccharide-reactive, heterocyclic alkyl, aryl or alkaryl reagents include any reagents having a polysaccharide-reactive site and at least one cationic site, which may be present within a 5- or 6-member, nitrogen-containing, alkyl, aryl or alkaryl ring. Other cationic site(s) may be present in the same ring or in one or more additional 5- or 6-member, nitrogen-containing, alkyl, aryl or alkaryl ring(s); or in one or more alkyl, aryl or alkaryl tertiary or quaternary amine-substituted alkyl(s); or polymeric forms (e.g., about 3 to 10 alkyl-containing or 3 to 5 aryl-containing cationic monomers) thereof; or combinations thereof. Exemplifying this class are single polysaccharide-reactive site dimers and oligomers of acetamidoalkylimidazoles. Reagents which yield a quaternary amine containing substituent cannot be employed in the first step of the site selective reaction, but may be employed in the second step.

Where polymeric forms of the reagent are used, the practitioner will appreciate that reaction efficiencies will dictate the upper limits of polymer size suitable for use herein. If polysaccharide derivatization is carried out in water, poor water solubility and the hydrolysis of particularly labile reagents will render certain embodiments (e.g; polymeric, aryl-containing, imidazole reagents) unsuitable. If polysaccharide derivatization is carried out in an organic solvent, or with a substantially dry process, limitations on reagent selection will tend to arise from solubility or dispersibility of the reagent in the organic solvent, and from steric hinderance which may prevent the polysaccharide-reactive site of large reagents from readily coming into contact with polysaccharide hydroxyl groups.

One group of suitable cationic reagents are disclosed in a commonly assigned co-pending U.S. patent application Ser. No. 07/376.779, filed July 7, 1989 by Tsai, et al., which is hereby incorporated by reference.

The cationic reagent used in the second, site selective step of the reaction must be selectively reactive only with the cationic substituent of the polysaccharide at a pH from 7.0 to 9.0. Except as noted above, the same group of cationic reagents may be used in the first and second steps.

In the examples which follow, all parts and percentages are given by weight and all temperatures are in degrees Celsius unless otherwise noted. Reagent percentages are based on dry polysaccharide. The nitrogen content of the starch derivatives was measured by the Kjeldahl method and is based on dry polysaccharide.

The following test procedures were used in the examples which follow to characterize the utility of the starch and other polysaccharide derivatives in the manufacture of paper.

BRITT JAR DRAINAGE PERFORMANCE TEST

Drainage performance of the starch derivatives was tested employing a Britt Jar which was modified by the addition of an extended mixing cylinder and an agitator set at 250 rpm. Unbleached softwood Kraft was beaten to a 500 ml CSF (Canadian Standard Freeness) and diluted to 0.5% consistency. The pH was adjusted to 8.0.

A 1.5% solids starch slurry was cooked at 104° C. (220° F.) in a laboratory scale steam injection cooker at a flow rate of 65 ml/min. The resulting starch dispersion was diluted to 0.4% solids, and added, with agitation, to a 345 ml aliquot of the pulp suspension at the appropriate addition level. The suspension was then added to 1,500 ml of water in the Britt Jar and the agitator was turned on. A stopper was removed from the base of the jar and the time in seconds required for 1,200 ml of water to drain through a 200 mesh wire screen was noted. The drainage rate was calculated as ml/second. Drainage efficiency or performance was calculated as a percentage of the control.

The control for the drainage test in an alkaline system (e.g. pH=8.0) consisted of a cationic starch ether derivative of the prior art, i.e a diethylaminoethyl ether of waxy maize containing 0.27% nitrogen (dry weight basis). The control for an acid system consisted of an amphoteric starch ether derivative of the prior art. i.e., a phosphorylated diethylaminoethyl ether of waxy maize containing 0.27% nitrogen and 0.1% phosphorus (dry weight basis). Both starch derivatives were prepared as described in U.S. Pat. No. 3,459,632 issued on Aug. 5, 1969 to Caldwell, et al.

EXAMPLE I

This example illustrates the preparation of a dicationic starch derivative having the structure:

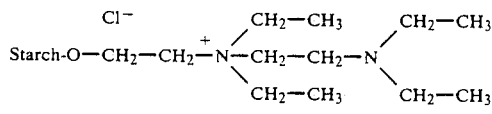

A. Preparation of a tertiary-amine-containing starch derivative

A solution of 150 ml water and 30 g sodium sulfate was placed in a pint jar and 100 g of waxy maize was slurried in the solution. A total of 4 g of diethylaminoethyl chloride (DEC) was added to the reaction and the pH was adjusted to 11.8 and held by means of a pH controller using 3% sodium hydroxide. The reaction was heated in a constant temperature bath at 40° C. for 18 hours. The starch was recovered by adjusting the pH to 7.0, and filtering and washing with water (3×150 ml). The starch was air-dried to less than 15% moisture and analyzed for nitrogen by the Kjeldahl method. The product contained 0.31% nitrogen (dry weight basis).

B. Reaction of a tertiary-amine-containing starch with diethylaminoethyl chloride (DEC) at pH 8.0

The starch prepared by the method of part A, above, was slurried in water (150 ml) and an appropriate (4.0 g) amount of DEC was added to the slurry. The pH was maintained so that it did not rise above 8.5 or fall below 7.5. The reaction was stirred at 45° C. for 48 hours, and the pH was thereafter neutralized to approximately 7. The starch was filtered and washed with water (3×150 ml) and air-dried to less than 15% moisture. The nitrogen content was 0.498%. A similar reaction with non-cationic starch yielded a starch product containing no nitrogen This example shows that under these conditions DEC reacts only with the tertiary nitrogen atoms and not with the starch hydroxyl groups.

EXAMPLE II

Evaluation of Dicationic Starch for Drainage in Alkaline (Non-Alum-Containing) Papermaking Starch prepared by the method of Example I was jet-cooked at 104° C. (220° F.) and then diluted to a 1% starch solids dispersion. The appropriate amount of starch (0.5 to 2% based on pulp weight) was added to the pulp and placed in a modified Britt jar The drainage was measured in mls/second. The results are summarized in Table I. The results indicate that dicationic starches prepared by the method of Example I give drainage results which are superior to those of commercially used, cationic starches

TABLE 1

| Drainage Performance for Cationic and Dicationic Starch Additives | | |
|---|---|---|
| Starch | Addition Level (%) | Drainage (% of standard) |
| Cationic waxy maize | 0.5 | 100 |
| Dicationic waxy maize | 0.5 | 109 |
| Cationic waxy maize | 1.0 | 100 |
| Dicationic waxy maize | 1.0 | 130 |
| Cationic waxy maize | 2.0 | 100 |
| Dicationic waxy maize | 2.0 | 125 |

EXAMPLE III

This example illustrates the site selective reaction preparation of an amphoteric dicationic starch having the structure:

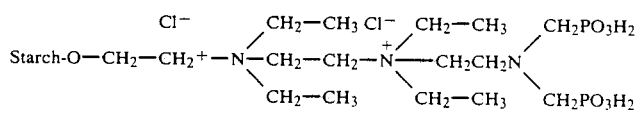

A total of 100 g of dicationic starch (prepared as in Example I) was slurried in 150 ml of water and the pH was adjusted to 8.0. A total of 5 g of N-(2-chloroethyl)-iminobismethylenephosphonic acid was added to the slurry. The slurry was stirred for 48 hours and the pH was maintained between 7.5 and 8.5 throughout the reaction. The starch was then recovered by adjusting the pH to 6.5, filtering and washing with water (3×150 ml) followed by air drying. The product contained 0.39% phosphorous and 0.45% nitrogen. The initial dicationic starch had 0.39% nitrogen. These results show that an amphoteric dicationic starch can be prepared by site selective reaction.

EXAMPLE IV

This example illustrates the site selective reaction preparation of a dicationic starch having the structure:

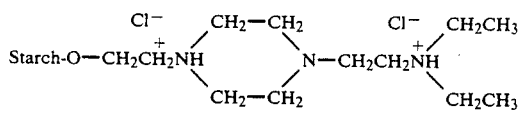

An ethyl-piperazine starch derivative was prepared by reacting 2-chloroethylpiperazine with starch under the conditions described in Example I, Part A. A total of 100 g of this starch derivative was slurried in 150 ml of water and the pH was adjusted to 8.0 using dilute sodium hydroxide. Diethylaminoethylchloride (3.0 g) was added, the slurry was stirred for 48 hours, and the pH was controlled such that the pH did not fall below 7.5 or rise above 8.5. The starch was recovered by adjusting the pH to 6.5, filtering, washing with water (3×150 ml). and air-drying. After air-drying the sample was analyzed for nitrogen and found to contain 0.54% nitrogen. The ethyl-piperazine starch derivative initially contained 0.35% nitrogen. These results demonstrate that a secondary amine will react with the DEC in a site selective manner to yield a polycationic starch derivative.

Now that the preferred embodiments of the present invention have been described in detail, various modifications and improvements thereon will become readily apparent to those skilled in the art. Accordingly, the scope and spirit of the invention are to be limited only by the claims and not by the foregoing specification.

We claim:

1. A polycationic polysaccharide derivative containing more than one cationic substituent per substituted hydroxyl group, which is prepared by a site selective reaction of a cationic polysaccharide ether derivative with a cationic reagent at a pH from 7.0 to 9.0.

2. The polycationic polysaccharide derivative of claim 1, having the structure:

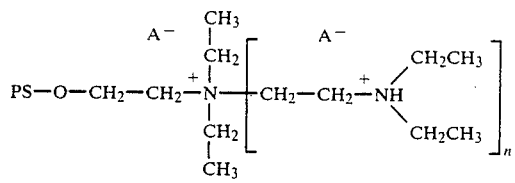

Wherein PS is a polysaccharide; A⁻ is an anion; and n is an integer from 1 to about 10.

3. The polycationic polysaccharide derivative of claim 1, wherein the cationic reagent is selected from the group consisting of cationic alkyl, aryl, alkaryl, cycloaliphatic, or heterocyclic amines, and polymers thereof.

4. A site selective reaction for the preparation of a polycationic polysaccharide derivative containing more than one cationic substituent per substituted hydroxyl group, comprising the steps:
   (a) reacting a polysaccharide with a cationic etherifying reagent at a PH from 9.0 to 12.5 to form a cationic polysaccharide derivative;
   (b) lowering the pH to 7.0 to 9.0; and
   (c) reacting the cationic polysaccharide derivative with a cationic reagent which reagent selectively reacts with a cationic substituent group rather than a hydroxyl group of the cationic polysaccharide derivative.

5. The reaction of claim 4, wherein the cationic etherifying reagent is selected from the group consisting of activated halogens, halohydrins and epoxides containing primary, secondary or tertiary amine substituents.

6. The reaction of claim 5, wherein the cationic etherifying reagent is a diethylaminoethyl halide.

7. The reaction of claim 4, wherein the cationic reagent is selected from the group consisting of activated halogens, halohydrins and epoxides containing primary, secondary, tertiary or quaternary amine substituents.

8. The reaction of claim 7, wherein the cationic reagent is a diethylaminoethyl halide.

* * * * *